United States Patent
Harel et al.

(10) Patent No.: US 9,286,102 B1
(45) Date of Patent: Mar. 15, 2016

(54) DESKTOP IMAGE MANAGEMENT FOR HOSTED HYPERVISOR ENVIRONMENTS

(71) Applicant: VMware, Inc., Palo Alto, CA (US)

(72) Inventors: Boaz Harel, Herzliya (IL); Yaniv Weinberg, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/534,115

(22) Filed: Nov. 5, 2014

(51) Int. Cl.
*G06F 9/46* (2006.01)
*G06F 9/455* (2006.01)

(52) U.S. Cl.
CPC ........ *G06F 9/45545* (2013.01); *G06F 9/45558* (2013.01); *G06F 2009/45562* (2013.01); *G06F 2009/45579* (2013.01)

(58) Field of Classification Search
CPC .................................... G06F 9/45545
USPC .................................. 718/101–108
See application file for complete search history.

(56) References Cited

U.S. PATENT DOCUMENTS

| | | | | |
|---|---|---|---|---|
| 2008/0059556 A1* | 3/2008 | Greenspan | ............ | G06F 9/5077 709/201 |
| 2010/0037296 A1* | 2/2010 | Silverstone | ............ | G06F 21/445 726/3 |
| 2010/0262794 A1* | 10/2010 | De Beer | ............ | G06F 9/45533 711/162 |
| 2010/0287544 A1* | 11/2010 | Bradfield | ............ | G06F 21/53 717/172 |
| 2012/0191575 A1* | 7/2012 | Vilke | ............ | G06Q 30/0641 705/27.1 |
| 2013/0007733 A1* | 1/2013 | Fries | ............ | G06F 8/68 718/1 |
| 2013/0185716 A1* | 7/2013 | Yin | ............ | G06F 9/45558 718/1 |

OTHER PUBLICATIONS

Younge, Andrew J., et al. "Efficient resource management for cloud computing environments." Green Computing Conference, 2010 International. IEEE, 2010, pp. 1-8.*

Berryman, Alex, et al. "Vdbench: A benchmarking toolkit for thin-client based virtual desktop environments." Cloud Computing Technology and Science (CloudCom), 2010 IEEE Second International Conference on. IEEE, 2010, pp. 480-487.*

Beaty, Kirk, Andrzej Kochut, and Hidayatullah Shaikh. "Desktop to cloud transformation planning." Parallel & Distributed Processing, 2009. IPDPS 2009. IEEE International Symposium on. IEEE, 2009, pp. 1-8.*

* cited by examiner

*Primary Examiner* — Satish Rampuria (57) ABSTRACT

A desktop image management system is described that can be used to efficiently manage desktops and desktop image data in hosted hypervisor environments. The efficiency of backing up data and otherwise managing desktops that are running on virtual machines in a hosted hypervisor environment can be improved by utilizing an image management client installed in the host operating system and individual drivers installed on each virtual machine running on the hosted hypervisor. The image management client may also simplify and improve the process of distributing software updates from the central server to target virtual machines running on the hosted hypervisor environment.

14 Claims, 5 Drawing Sheets

DESKTOP IMAGE MANAGEMENT FOR HOSTED HYPERVISOR ENVIRONMENTS

TECHNICAL FIELD

The present disclosure generally relates to desktop image management and more particularly relates to techniques for improving the performance of backing up, restoring and managing desktop image data in hosted hypervisor environments.

BACKGROUND

Enterprise desktop image management is one of the most challenging tasks for Information Technology (IT) departments of large organizations today. A typical IT department needs to manage, protect, and distribute software updates and modifications, upgrade operating systems and applications, as well as be able to back up and restore the user's data and settings on demand One issue for IT departments is the complexity of managing a large number of different desktop instances that may exist on the computers of enterprise users. The sheer number of user computers to manage; the proliferation of operating system (OS) images and applications; and the complex set of operations, such as deployment, provisioning, patching, upgrading, installing and managing applications, compliance testing, troubleshooting and re-imaging; all make IT responsibilities a very challenging task. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient desktop management without sacrificing end user experience.

A number of software tools exist to aid IT departments in the endeavor of desktop image management. For example, numerous backup and restore software programs can be installed on individual desktops (e.g., an employee's laptop or desktop PC) and these programs typically utilize a client software program installed on the desktop that runs on a schedule (e.g., once per day or at night while computers aren't in use). The client program typically collects, compresses, encrypts, and transfers the data to a remote backup service provider's servers or other off-site storage devices. Such backup and restore tools help IT departments ensure that most user data is not lost or can be recovered, however, a number of difficulties and inconveniences with desktop management still persist.

One particular area of concern addressed by this disclosure arises in situations when individual users are running a hosted hypervisor on their device, such as in situations commonly referred to as "bring your own device", where employees are permitted to bring their own individually owned device to work and utilize it as a work device to access privileged company information and applications. Hypervisors enable the creation and execution of virtual machines (VMs), which are software emulations of real physical computers. Each VM may include its own guest operating system, applications and configuration, similar to a physical computer. For example, a single user's computer may be running separate VMs to represent their "personal computer" and "work computer" which might contain sensitive data of the organization and so on. In some cases, a single user's computer may run a fairly large number of VMs that all share the hardware resources of the computer, which presents a multitude of challenges for IT departments that wish to backup, restore, upgrade and manage all or some of these VMs.

DETAILED DESCRIPTION

Systems and methods in accordance with various embodiments of the present disclosure overcome at least some of the above mentioned shortcomings and deficiencies by providing more efficient ways to manage desktops and desktop image data in hosted hypervisor environments. In particular, embodiments described herein improve the efficiency of backing up data, distributing updates and otherwise managing desktops that are running on virtual machines in a hosted hypervisor environment.

As used throughout this disclosure, the term "hypervisor", also sometimes referred to as a virtual machine monitor or a virtual machine manager (VMM), refers to the software that runs virtual machines on a physical computer. The physical computer on which the hypervisor is running is usually referred to as the "host" computer, while the individual virtual machines are referred to as "guests". Each virtual machine (VM) can be a full virtual representation of a real physical computer, including a virtual representation of the hard drive (referred to herein as a virtual disk or a virtual machine disk (VMDK)), and the VM can run a full instance of a complete operating system (referred to as a "guest" operating system).

Hypervisors can generally be classified into two categories—the type 1 "native" hypervisors (also sometimes referred to as "bare metal" hypervisors) and the type 2 "hosted" hypervisors. Native hypervisors generally run directly on the host computer's hardware and native hypervisors can themselves host multiple virtual machines that have individual guest operating systems. In contrast, hosted hypervisors run within a conventional host operating system (e.g., Windows, Linux, etc.) and thus hosted hypervisors represent a second layer of software above the hardware. Various embodiments of the present invention are directed primarily to hosted hypervisor environments, however some of the techniques described herein can be applied to native hypervisors as well.

In hosted hypervisor environments, an end user may have a personal computer that includes a host operating system that includes a hosted hypervisor. The hosted hypervisor can be used to run multiple virtual machines that include their own individual guest operating systems. In many cases, it is desirable for an IT department of an organization to backup and manage each individual virtual machine running on the end user's computer. More specifically, it is important to keep any changes occurring on each virtual machine synchronized (e.g., in real time or near real time) with a remote offsite central server so that if the computer or any of its virtual machines crashes, all (or at least majority) of the data can be recovered. Conventionally, in order to perform backup/restore and other desktop management operations, the IT of an organization could install a backup/restore agent software program on each individual virtual machine's guest operating system, which would synchronize any changes occurring on the VM with a remote server. However, since multiple virtual machines are typically hosted on a single computer, all of the virtual machines on that computer share the same physical resources of the computer, including the central processing unit (CPU), random access memory (RAM), flash memory, disk, network interface card (NIC) and the like. If a separate agent were to be installed on each individual VM, and if each agent were to perform synchronization of changes over the network to a remote server fairly frequently, the physical hardware resources of the end user's computer would likely be overwhelmed since many agents could be performing network, I/O and other operations on the device at any given time simultaneously. In an alternative solution, a single agent could be installed on the host operating system, which can keep each file on the entire device synchronized, including the virtual disk of each VM. However, because the agent operating inside the host OS would have no file-level visibility inside of the virtual disk of each VM, the agent could only treat the entire virtual disk of each individual VM as an individual file, such that any change made to the virtual disk would cause the agent to replicate the entire modified virtual disk to the remote server in order to keep the changes synchronized. Virtual disks are typically very large (multiple gigabytes or more) which are constantly changing whenever the virtual machine is running and it would thus be very inefficient to attempt to replicate the entire virtual disk every time a file on it is modified. Scanning such large files for changes is inefficient because the entire file would need to be scanned in order to determine what has been changed on it.

The various embodiments described below address the aforementioned issues and otherwise enable efficient management of desktop images within hosted hypervisor environments. In various embodiments, a single image management client is installed within the host operating system and a separate driver is installed on each virtual machine managed by the hosted hypervisor. Once installed, the image management client can execute as a background process within the host operating system (transparent with respect to the user) and the image management client can monitor all of the changes occurring on the computing device and replicate the changes to a remote server over a network connection. The drivers operating inside each VM would have file-level access to their respective virtual disks and as such, each driver can detect any modification of a file in their respective virtual disk and provide file identification information of the file that was modified to the image management client in order to enable the image management client to replicate the modifications of the file to the remote server. Specifically, for data replication purposes, because the driver is a filter driver installed inside the guest operating system of the virtual machine, the image management client can use the filter driver to capture a volume snapshot service (VSS) snapshot of each virtual disk and scan these virtual disks at file level, thereby enabling backup of only changed and important files as opposed to the entire opaque virtual disk that is constantly changing. In this manner, the drivers can provide the information identifying each file that was modified in the virtual disk of the virtual machine to the image management client operating inside the host OS. The image management client can read the file in the virtual disk (e.g., via a virtual machine communication interface) and replicate the changes to the remote server.

Additionally, in some embodiments, the image management client can be used by IT to deploy new applications (or other software updates) on existing VMs on the hosted hypervisor and/or create new VMs having customized software applications. In order to do this, the image management client on the host could download one or more application layers from the remote central server, where each application layer contains the necessary files and registry entries for the respective application to be deployed on the target VM. The image management client could then write the necessary files/registry entries into the virtual disk of the VM. Then, once the guest VM is booted, the software would already be installed on the VM, thereby eliminating the need to manually install each application using installation tools. This would also work for operating system (OS) layers and OS updates. By utilizing the image management client in this manner, IT departments can control when and which applications are installed on which VM on each end user's (e.g., employee's) device. In various embodiments, throughout the process of backup/restore and/or deploying applications, the image management client can utilize a number of deduplication techniques, as will be described in further detail later in this specification.

Figure 1:
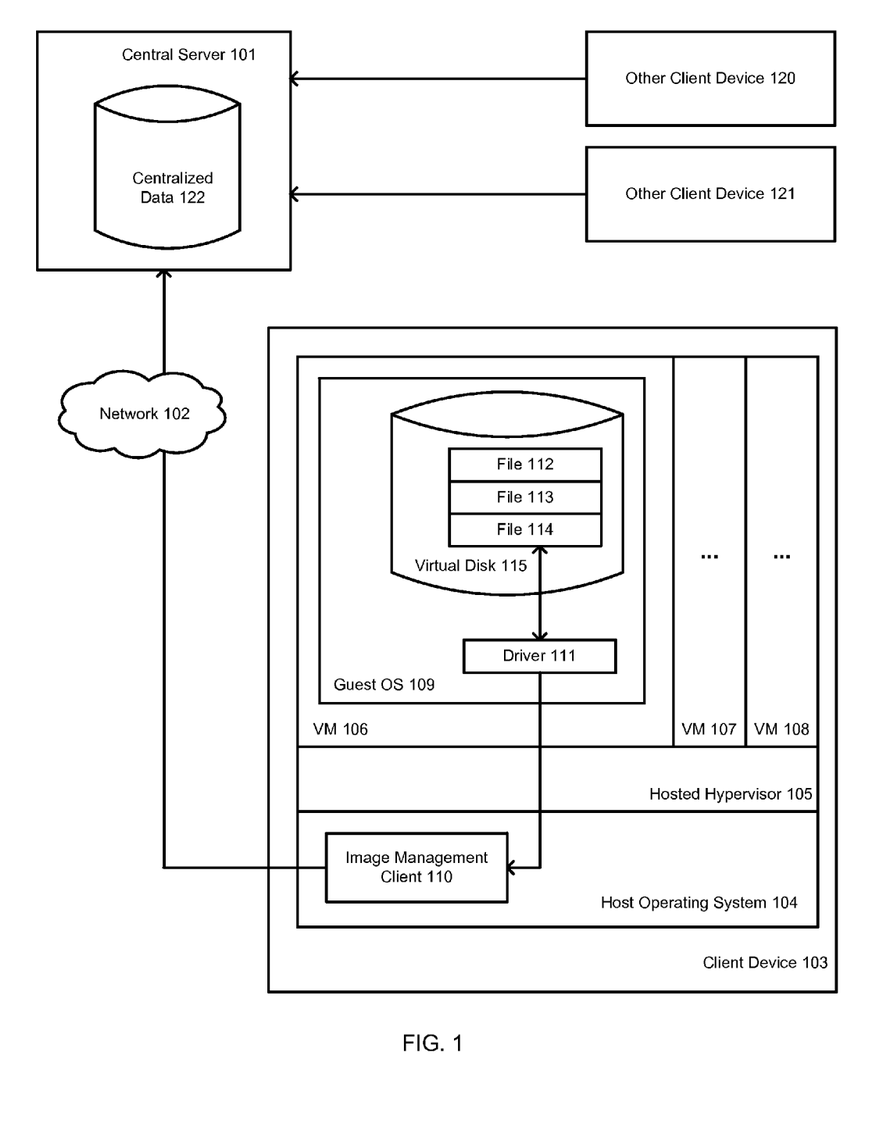
FIG. 1 illustrates an example of an image management client operating in a hosted hypervisor environment, in accordance with various embodiments.

FIG. 1 illustrates an example of an image management client operating in a hosted hypervisor environment, in accordance with various embodiments. As previously described, an end user's client device 103 (e.g., a laptop) can include a host operating system 104, such as Microsoft Windows, Linux or the like. The host operating system 104 may be running a hosted hypervisor 105 which can be used to execute a plurality of virtual machines (106, 107, 108). Each virtual machine (106, 107, 108) can include its own individual guest operating system (OS), such as guest OS 109 and its own individual virtual disk, such as virtual disk 115. In various embodiments, the virtual disk 115 represents a real physical hard disk, including its structure and organization, and is typically interpreted by the hypervisor 105 as a system hard disk drive. Virtual disks conventionally have a particular file type extension, such as .VMDK or .VHD.

In order to enable IT to manage the desktop image data on the client device 103, an image management client 110 is installed on the client device 103. One of the functions of the image management client 110 is to monitor any changes occurring on the client device 103 and to replicate those changes to a remote central server 101, which can maintain the centralized and up-to-date desktop image data for all end user devices (103, 120, 121) across the organization for backup and restore purposes. For example, once the image management client 110 is installed on the host operating system 104, the image management client 110 is responsible for scanning the file system, registry and other information that comprise the desktop image of the user and for transmitting copies of all of this information to the remote central server 101. This initial transmission of the desktop image information is referred to herein as "centralization". In various embodiments, to optimize the centralization process, the image management client 110 may only transmit those files and information (e.g., blocks) to the central server 101 which are not already available on the central server 101, thereby de-duplicating any information centrally stored on the central server 101. This can be performed by the image management client first sending, to the central server, a manifest of all files that are stored on the client device and the server then responding with another manifest, indicating which subset of those files are not available on the central server. The client can then upload the needed subset of files to the central server.

This process can substantially reduce network congestion, time and resources needed to construct an image of the client device on the central server.

Once centralization is complete, the client device 103 is registered as one of the endpoints with the central server 101. The central server 101 is responsible for storing desktop images (i.e., centralized data 122) for each endpoint client device (103, 120, 121) in the enterprise. In addition, the central server 101 provides a console that enables an IT administrator to distribute software updates to each image management agent 110 that is installed on an endpoint device, as will be discussed in further detail with reference to FIG. 2.

Once the client device 103 has been registered as an endpoint with the central server 101, the image management client 110 becomes responsible for keeping the datacenter desktop image (i.e., the image data stored on the central server 101) synchronized with changes to the endpoint. Any changes to the endpoint are uploaded to the datacenter desktop image—both user changes and IT-controlled layer updates. For example, the image management client 110 can take periodic snapshots of the endpoint client device 110 and send those snapshots to the central server 101 in the datacenter. These snapshots capture incremental changes to the full desktop image and provide time-stamped rollback points for restoring the desktop to a previous system state. In one embodiment, each snapshot contains the incremental changes to the original desktop image since the previous snapshot. Multiple endpoint snapshots are stored in the datacenter. Snapshots are automatic and can be taken at a configurable time interval. For example, one incremental snapshot can be taken by default every twenty-four hours. However, the user or administrator can configure the system such that snapshots are taken daily, hourly or even more frequently. In various embodiments, the processes of capturing the snapshots and transmitting them to the central server 101 can be performed by the image management client operating in the background, transparently from the perspective of the user, i.e., such that the user is not aware of the process executing on their device. Using the snapshots stored in the central server 101, the IT administrator has the option of restoring user settings and files along with the IT-controlled elements of the desktop.

Continuing with the illustration in FIG. 1, in order to enable the image management client 110 to function efficiently within a hosted hypervisor environment, individual drivers, such as driver 111, are installed on each virtual machine hosted by the hypervisor 105 on the client device 103. The drivers can be installed as part of the initial installation of the image management client 110. The driver 111 serves to provide, to the image management client 110, file-level visibility and access into the virtual disk 115 of the virtual machine 106 on which it is operating. As previously discussed, in order for the image management client 110 to efficiently synchronize changes occurring in each VM (e.g., by uploading periodic snapshots to the central server), it is important that the image management client 110 have file-level access and visibility into the virtual disk of each VM. Because the driver 111 can be a filter driver installed inside the guest OS 109 of the virtual machine 106, the driver 111 is able to have file-level access to the virtual disk 115. For example, in the event the virtual disk is of the "Virtual Machine Disk (VMDK)" format, the image management client 110 can mount the VMDK file system and obtain file-level access inside the VMDK images, enabling it to provide full manageability as well as leverage transfer efficiencies in de-duplication between the host and guest files. Specifically, for data replication purposes, the image management client 110 can use the driver to capture a Volume Snapshot Service (VSS) snapshot of each VMDK file and scan these VMDKs at file level, enabling backup of only changed and important files as opposed to the opaque VMDK that is constantly changing. In this manner, because the driver 111 is able to provide specific file identification information to the image management client 110, it enables the image management client 110 to replicate changes occurring in individual files (112, 113, 114) of the virtual disk 115, rather than having to replicate the entire virtual disk 115 to the central server 101 over the network 102.

In one embodiment, each time a file inside the VM 106 is changed, it is marked as a changed file and subsequently the image management client 110 will scan it. When performing an initial backup of the virtual machine 106, the entire virtual disk (e.g., VMDK) is backed up over the network 102 to the central server 101. Subsequently, whenever files are modified, the image management client 110 will only upload the delta of the particular files that were modified since the last upload. Because the driver 111 is operating inside each VM, the image management client 110 is able to identify which files were changed and therefore only backup individual files (112, 113, 114) and not the entire virtual disk 115.

In one embodiment, the driver 111 is a filter driver configured to monitor the OS traffic with the virtual disk 115 in order to detect when particular files (112, 113, 114) were modified. A number of tools can be used to provide access from the host machine inside the VM, e.g., tools for communicating between the host and the guest, such as the Virtual Machine Communication Interface (VMCI) or the VIX API available from VMware, Inc. These tools may be used to move the files that were changed from the guest into the host machine and then only these files will be uploaded by the image management client 110 to the central server 101. As such, the driver 111 can collect the files that were changed and transfer them to the host operating system, where the image management client 110 can scan and backup the changed files.

Figure 2:
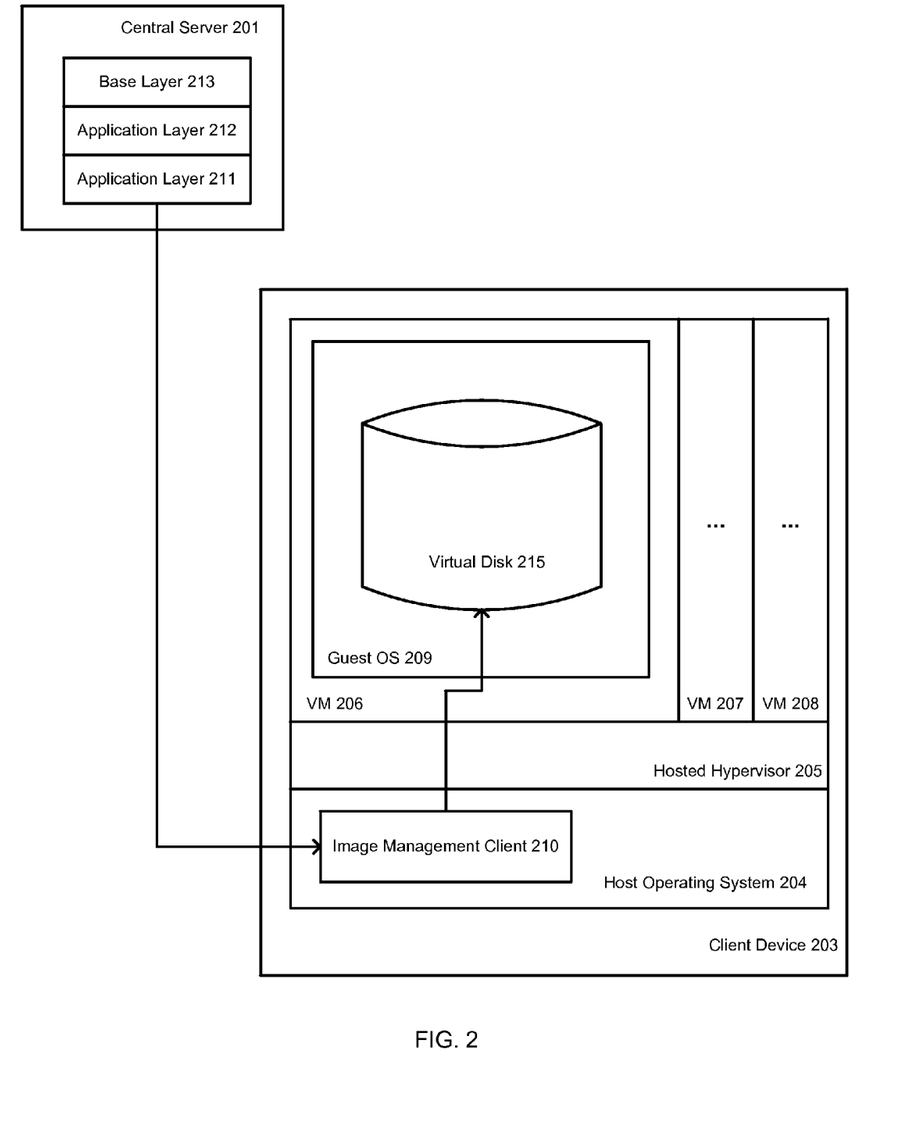
FIG. 2 illustrates an example of distributing a software update from a remote server to a virtual machine running on a hosted hypervisor, in accordance with various embodiments.

FIG. 2 illustrates an example of distributing a software update from a remote central server to a client device having a hosted hypervisor, in accordance with various embodiments. In some cases, the IT department of an organization may wish to distribute a software update to a user that is running a hosted hypervisor environment on their end device. For example, the IT department may wish to deploy a new application to an employee's "work VM" that is running on the employee's otherwise personal laptop. Alternatively, IT may wish to create a new VM on the user's device. In this scenario, IT could conventionally require that the user download an entire virtual disk of a VM that is already configured per IT's specifications. However, as previously mentioned, downloading large virtual disks over network connections is inefficient, particularly when doing it for many endpoint devices. Alternatively, the IT department could require each end user to go through the standard download and installation process, which may be quite tedious, especially if numerous applications need to be installed frequently.

In various embodiments, the image management client 210 on the endpoint client device 203 can be used to install software directly into the guest OS 209 on any VM (e.g., VM 206) and it can do so in response to instructions from the central server, without the need to force the end user to manually download and install the applications themselves. Moreover, the image management client 210 can utilize deduplication by downloading only those files which are missing from the client device 203. For example, it may be that many of the operating system files, registry entries and other data is already present on the client device 203 by virtue of the hosted hypervisor 205 running other VMs (207, 208) or by virtue of the client having a host operating system 204. In order to de-duplicate any unnecessary network downloads, the image management client 210 may only need to download those files/blocks from the central server 201 which are not already available on the client device 203. The process used to determine which files need to be downloaded from the central server can be similar to the initial centralization process, where the client and the server first exchange manifests to determine which files are not available on the client device. Those files which are already available on the client device 203 may simply be copied (or referenced) locally, as necessary. This can also eliminate the need to download and provision an entire virtual disk (VMDK) to provision specific software on the client device 203.

In one embodiment, to distribute such an update, the VM 206 would first need to be shut down. Then the image management client 210 on the device 203 would manually write the necessary files into the virtual disk 215 of the VM 206. Once the files have been written to the virtual disk, the VM 206 can be booted up, at which time the software update (e.g., new application) would already be installed on the VM 206. This would also work for OS layers and OS updates. In this manner, the image or application updates can be applied to the virtual disks in an offline fashion.

In order to change the guest operating system, the image management client 210 may need to mount the virtual disk 215 in order to get access (file level access) to the virtual disk 215. In the backup scenario, the image management client only needs read access to the virtual disk and therefore the client does not need the capability to mount the virtual disk, however, in order to make changes (i.e., install software) to the virtual disk, the client 210 would need to mount the virtual disk.

As illustrated in FIG. 2, the image management client 210 is capable of performing various fixes, updates and new software installations on the virtual machine, such as VM 206. For example, the IT administrator can use a console on the central server 201 to apply a new base layer 213 or an application layer (211, 212) to the desktop image that the user has on their virtual machine. As used herein, the term "layer" is a set of files, registry entries and other databases (e.g., Windows-specific databases, etc.) that are necessary to be merged onto the virtual machine in order to apply a change to the virtual machine. A base layer 213 contains all of the files, registry entries and databases required to run an operating system with a set of predefined applications, drivers and virtual devices on the virtual machine. An application layer (211, 212), on the other hand, contains all of the files, registry entries and databases required to merge a new application (or an updated version of an existing application) on the virtual machine. The application layer may also include drivers and virtual devices.

In various embodiments, a layer can be constructed on the central server by capturing several snapshots of a virtual machine and then determining which files, drivers and registry entries are different between those snapshots. For example, in order to construct an application layer for a particular application, a first snapshot of a virtual machine is captured prior to installation of an application. The application is then installed on the virtual machine, e.g., using a standard application installation process. Once the application has been installed, a second snapshot of the virtual machine is taken and compared to the first snapshot in order to determine the delta between the two snapshots. The delta would contain the differences, i.e., the files and registry entries needed for execution of the application, and therefore would comprise the application layer. A similar process can be used to create a base layer, which contains the files and registry entries to install a full operating system on a client device.

When an IT administrator decides to apply a change to a target virtual machine on an endpoint client device using the console of the central server 201, the administrator can first create an application layer or a base layer (or simply select an existing layer), as previously described. The administrator can then instruct the central server 201 to send the base or application layer to an image management client 210 on the user's endpoint device 203. The central server 201 has a full listing of the files on each target VM (i.e., the desktop image of that VM which it obtained from the image management client 210 during centralization) and the central server 201 also has a full listing of the files in the application layer. The server 201 also has the registry (e.g., Windows registry) of the target VM and the registry of the application layer. Based on the differences, the central server 201 determines which files are missing on the target VM and these files need to be downloaded from the server 201 in order to apply the layer. The downloading of the files can be performed by the image management client 210 on the client device. In some embodiments, the delivery of the files can be performed in an optimized manner such that the image management client 210 does not need to download those files which already exist locally on the client device 203. Instead, the image management client 210 determines which file blocks are needed on the target VM, downloads those particular blocks from the server 201 and stores the blocks into a side folder (e.g., staging area). Once the image management client 210 has all the necessary files and registry entries of the app layer, the image management client can perform an offline merge of the content of the target virtual machine with the content of the application layer (or base layer). In some embodiments, the end user may be required to restart the virtual machine when the merge is completed.

Figure 3:
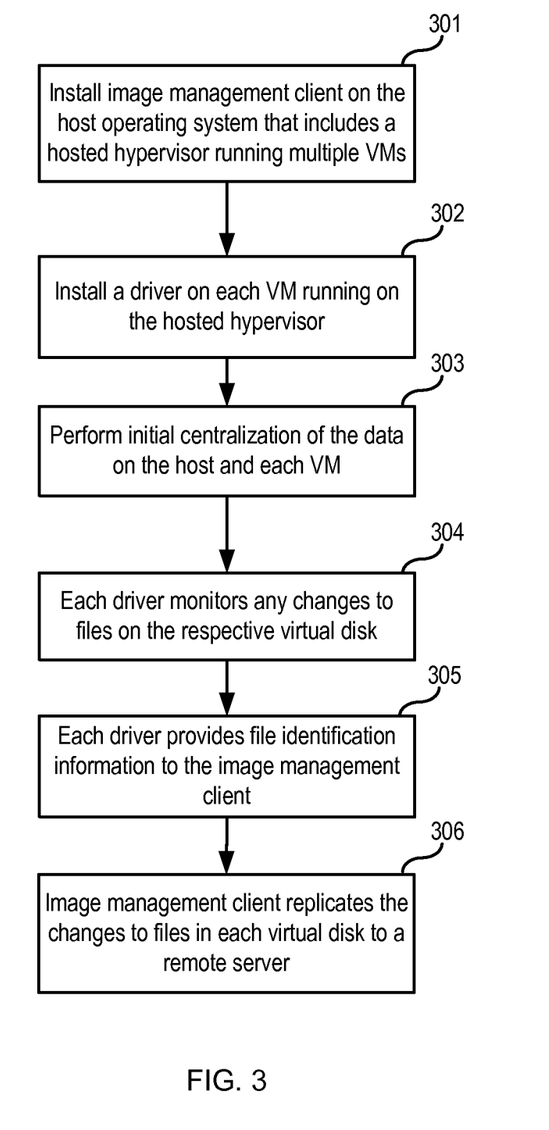
FIG. 3 illustrates an example of a process for installing and using an image management client in a hosted hypervisor environment, in accordance with various embodiments.

FIG. 3 illustrates an example of a process for installing and using an image management client in a hosted hypervisor environment, in accordance with various embodiments. As illustrated in operation 301, the image management client is installed on the host operating system of a client device. The image management client is responsible for periodically capturing snapshots of various files on the client device and for replicating those snapshots to a central server. The host OS includes a hosted hypervisor running multiple VMs. In various embodiments, it may be desirable for an IT department to manage the desktop image data of the various VMs operating on the client device. The image management client aids the IT in backing up, restoring, distributing updates to, and otherwise managing the data on those virtual machines.

In operation 302, a driver is installed on each individual VM running on the hosted hypervisor. The driver enables the image management client to obtain file level visibility and access to the virtual disks of the virtual machines running on the hosted hypervisor. In operation 303, once the image management client and the drivers have been installed on the client device, the image management performs the initial process of centralization. During this process, the image management client scans the file system, registry and other information that comprise the desktop image on the host operating system and each individual VM. The image management client then transmits copies of all of this information to the remote central server. In various embodiments, the centralization process utilizes deduplication such that the image management client does not need to transmit those files/blocks which are already present on the central server. Once the centralization process is complete, the central server has a full image of each desktop present on the client device, including the host OS and any VMs running on the hosted hypervisor.

After the initial centralization, he image management client monitors any changes being made on the client device, including the host OS and all of the VMs. In some embodiments, the drivers detect any changes made to the files on the virtual disks of the respective VM that the driver is installed on, as shown in operation 304. In operation 305, the drivers provide file identification information to the image management client. For example, each driver may monitor all OS traffic that accesses the virtual disk and capture file identification information related to which files were modified by the OS traffic. The driver then provides the file identification information to the image management client. In operation 306, the image management client then replicates those changes to the central server. For example, the image management client may periodically transmit the changes to each file on the virtual disks so that the central server can maintain snapshots of each virtual disk remotely.

Figure 4:
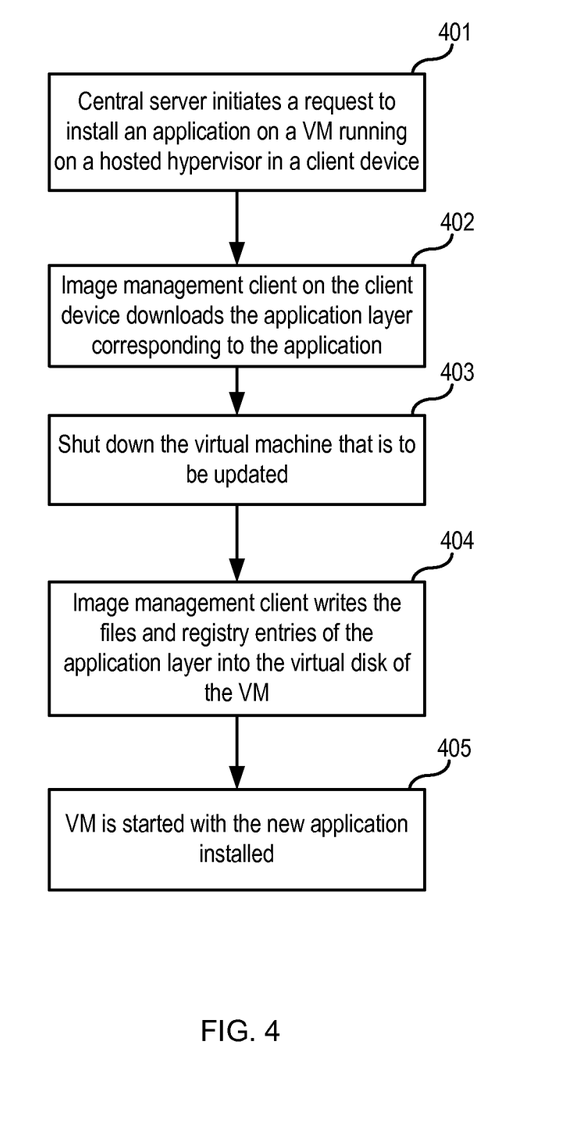
FIG. 4 illustrates an example process of distributing software updates to a client device that is running a hosted hypervisor, in accordance with various embodiments.

FIG. 4 illustrates an example process of distributing software updates to a client device that is running a hosted hypervisor, in accordance with various embodiments. In operation 401, the central server generates a request to install an application on a VM running on a hosted hypervisor in a client device. The request may be initiated by an administrator accessing a management console of the central server. For example, the administrator may select a particular application layer to be installed on a VM running on the hosted hypervisor on the client device. The server may then transmit the request to the image management client operating on the client device. In operation 402, the image management client on the client device downloads the application layer corresponding to the application to be installed. In operation 403, the target virtual machine which is to be updated is first shut down. In operation 404, the image management client writes the files, drivers and registry entries of the application layer into the virtual disk of the VM. In some embodiments, the image management client may first need to mount the virtual disk of the VM in order to write the necessary files into the virtual disk. Once the files have been written to the virtual disk, the VM can be started and the VM would have an executable version of the new application installed thereon. This process of updating the VM in a hosted hypervisor environment can be performed by the image management client (in conjunction with the instructions from the central server) without requiring the end user to go through the conventional download and installation process used to typically install an application.

Figure 5:
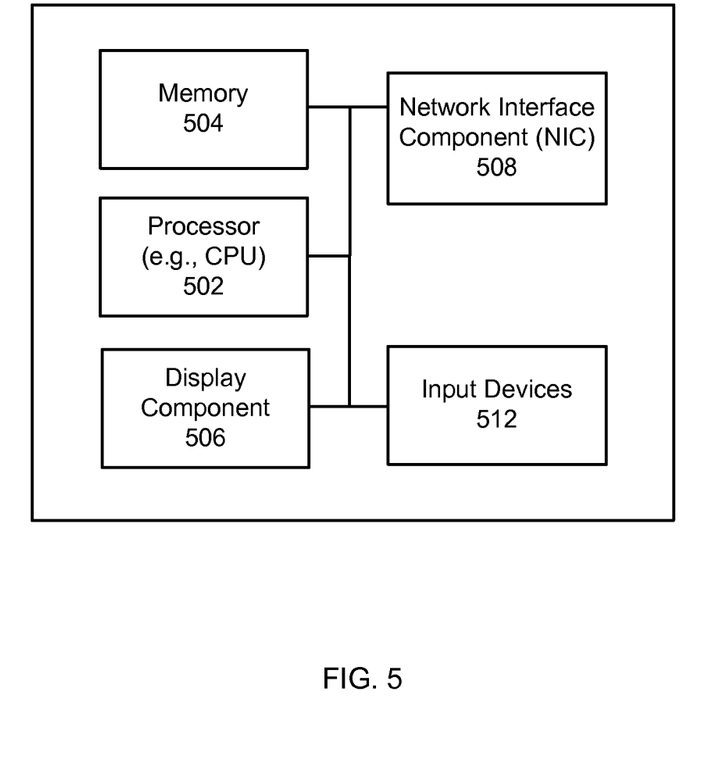
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The computing device typically can further comprise a display component 506, such as a monitor, a touch screen, liquid crystal display (LCD), or the like. In various embodiments, the computing device will include at least one input device 508 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information, such as raw data or corresponding virtual machine disk (VMDK) container may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device for managing desktop images in a hosted hypervisor environment, said system comprising:
    a host operating system on the computing device;
    a hosted hypervisor executing within the host operating system, the hosted hypervisor configured to manage one or more virtual machines, each virtual machine including a guest operating system, wherein each virtual machine is associated with a virtual disk;
    an image management client executing within the host operating system, the image management client configured to monitor changes on the computing device and to periodically replicate the changes to a remote server over a network connection;
    wherein each guest operating system on each virtual machine includes a driver configured to:
        detect a modification of a file in the virtual disk of the virtual machine in which the driver is operating; and
        provide file identification information of the file that was modified to the image management client operating within the host operating system to enable the image management client to replicate the modification of the file to the remote server;
        wherein the image management client is configured to:
            receive, from the driver, the information identifying the file that was modified in the virtual disk of the virtual machine;
            read the file in the virtual disk via a virtual machine communication interface; and
            replicate the modification of the file to the remote server;
    wherein the image management client is configured to use the driver to capture a volume shadow service (VSS) snapshot of the virtual disk and scan the VSS snapshot of the virtual disk at a file level to read the file using the information identifying the file.

2. The computing device of claim 1, wherein the driver is a filter driver configured to monitor input/output (I/O) traffic between the guest operating system and the virtual disk, detect changes to files in the virtual disk caused by the I/O traffic and send the file identification information to the image management client.

3. The computing device of claim 1, wherein the image management client is configured to:
    receive a request to restore the file on a first virtual disk of a first virtual machine;
    determine whether the file is available on any other virtual disk of any other virtual machine on the computing device or on the host operating system of the computing device;
    in response to determining that the file is available on a second virtual disk or on a host operating system, restore the file by reading the file from the second virtual disk or the host operating system; or
    in response to determining that the file is unavailable on any other virtual disk or the host operating system, retrieve the file from the remote server over the network connection.

4. The computing device of claim 1, wherein the image management client is configured to:
    receive a request to install an application on a virtual machine managed by the hosted hypervisor;
    processing a manifest received from the remote server to determine which files need to be downloaded from the remote server in order to obtain an application layer corresponding to the application;
    download, from the remote server, the needed files to obtain the application layer corresponding to the application;
    apply the application layer to a virtual disk of the virtual machine; and
    start the virtual machine.

5. The computing device of claim 1, wherein each of the one or more application layers includes a set of files and a set of registry entries to be copied to the new virtual machine in order to install an application on the new virtual machine.

6. A method for managing desktop images in a hosted hypervisor environment, said method comprising:
    executing a host operating system on the computing device;
    executing a hosted hypervisor within the host operating system, the hosted hypervisor configured to manage one or more virtual machines, each virtual machine including a guest operating system, wherein each virtual machine is associated with a virtual disk; and
    deploying an image management client executing within the host operating system, the image management client configured to monitor changes on the computing device and to periodically replicate the changes to a remote server over a network connection;
    wherein each guest operating system on each virtual machine includes a driver configured to:
        detect a modification of a file in the virtual disk of the virtual machine in which the driver is operating; and
        provide file identification information of the file that was modified to the image management client operating within the host operating system to enable the image management client to replicate the modification of the file to the remote server;

wherein the image management client is configured to:
   receive, from the driver, the information identifying the file that was modified in the virtual disk of the virtual machine;
   read the file in the virtual disk via a virtual machine communication interface; and
   replicate the modification of the file to the remote server;

wherein the image management client is configured to use the driver to capture a volume shadow service (VSS) snapshot of the virtual disk and scan the VSS snapshot of the virtual disk at a file level to read the file using the information identifying the file.

7. The method of claim 6, wherein the driver is a filter driver configured to monitor input/output (I/O) traffic between the guest operating system and the virtual disk, detect changes to files in the virtual disk caused by the I/O traffic and send the file identification information to the image management client.

8. The method of claim 6, wherein the image management client is configured to:
   receive a request to restore the file on a first virtual disk of a first virtual machine;
   determine whether the file is available on any other virtual disk of any other virtual machine on the computing device or on the host operating system of the computing device;
   in response to determining that the file is available on a second virtual disk or on a host operating system, restore the file by reading the file from the second virtual disk or the host operating system; or
   in response to determining that the file is unavailable on any other virtual disk or the host operating system, retrieve the file from the remote server over the network connection.

9. The method of claim 6, wherein the image management client is configured to:
   receive a request to install an application on a virtual machine managed by the hosted hypervisor;
   processing a manifest received from the remote server to determine which files need to be downloaded from the remote server in order to obtain an application layer corresponding to the application;
   download, from the remote server, the needed files to obtain the application layer corresponding to the application;
   apply the application layer to a virtual disk of the virtual machine; and
   start the virtual machine.

10. The method of claim 6, wherein each of the one or more application layers includes a set of files and a set of registry entries to be copied to the new virtual machine in order to install an application on the new virtual machine.

11. A non-transitory computer readable storage medium comprising one or more sequences of instructions, the instructions when executed by one or more processors causing the one or more processors to execute the operations of:
   executing a host operating system on the computing device;
   executing a hosted hypervisor within the host operating system, the hosted hypervisor configured to manage one or more virtual machines, each virtual machine including a guest operating system, wherein each virtual machine is associated with a virtual disk; and deploying an image management client executing within the host operating system, the image management client configured to monitor changes on the computing device and to periodically replicate the changes to a remote server over a network connection;

wherein each guest operating system on each virtual machine includes a driver configured to:
   detect a modification of a file in the virtual disk of the virtual machine in which the driver is operating; and
   provide file identification information of the file that was modified to the image management client operating within the host operating system to enable the image management client to replicate the modification of the file to the remote server;

wherein the image management client is configured to:
   receive, from the driver, the information identifying the file that was modified in the virtual disk of the virtual machine;
   read the file in the virtual disk via a virtual machine communication interface; and
   replicate the modification of the file to the remote server;

wherein the image management client is configured to use the driver to capture a volume shadow service (VSS) snapshot of the virtual disk and scan the VSS snapshot of the virtual disk at a file level to read the file using the information identifying the file.

12. The non-transitory computer readable storage medium of claim 11, wherein the driver is a filter driver configured to monitor input/output (I/O) traffic between the guest operating system and the virtual disk, detect changes to files in the virtual disk caused by the I/O traffic and send the file identification information to the image management client.

13. The non-transitory computer readable storage medium of claim 11, wherein the image management client is configured to:
   receive a request to restore the file on a first virtual disk of a first virtual machine;
   determine whether the file is available on any other virtual disk of any other virtual machine on the computing device or on the host operating system of the computing device;
   in response to determining that the file is available on a second virtual disk or on a host operating system, restore the file by reading the file from the second virtual disk or the host operating system; or
   in response to determining that the file is unavailable on any other virtual disk or the host operating system, retrieve the file from the remote server over the network connection.

14. The non-transitory computer readable storage medium of claim 11, wherein the image management client is configured to:
   receive a request to install an application on a virtual machine managed by the hosted hypervisor;
   processing a manifest received from the remote server to determine which files need to be downloaded from the remote server in order to obtain an application layer corresponding to the application;
   download, from the remote server, the needed files to obtain the application layer corresponding to the application;
   apply the application layer to a virtual disk of the virtual machine; and
   start the virtual machine.

* * * * *